United States Patent

[11] 3,615,456

[72] Inventors Jennie Lee Touchette;
 Arthur D. Ketley, both of Silver Spring, Md.
[21] Appl. No. 789,754
[22] Filed Jan. 8, 1969
[45] Patented Oct. 26, 1971
[73] Assignee W. R. Grace & Co.
 New York, N.Y.

[54] PROCESS FOR PHOTOIMAGING CERTAIN POLYMERIC SUBSTANCES CONTAINING PIGMENTS
 17 Claims, 1 Drawing Fig.
[52] U.S. Cl. .................................................. 96/35.1, 96/115
[51] Int. Cl. .................................................. G03c 5/00, G03c 1/68
[50] Field of Search ........................................... 96/115, 115 D, 35.1

[56] References Cited
UNITED STATES PATENTS

| | | | |
|---|---|---|---|
| 3,060,023 | 10/1962 | Burg et al. ..................... | 96/35.1 |
| 3,202,508 | 8/1965 | Heiart ........................... | 96/115 P |
| 3,218,167 | 11/1965 | Burg et al. ..................... | 96/35.1 |
| 3,147,119 | 9/1964 | Evans et al. .................... | 96/35.1 |
| 3,060,025 | 10/1962 | Burg et al. ..................... | 96/35.1 |

*Primary Examiner*—Norman G. Torchin
*Assistant Examiner*—Edward C. Kimlin
*Attorney*—Kenneth E. Prince ABSTRACT: A process for photoimaging polymeric layers of certain halogen-containing vinylogous resins and halogen-free metallic components is disclosed. The process typically includes assembling a unit which is made up of a polymeric layer and a translucent layer. A liquid media is placed between the two layers and is most frequently sealed around the edges to prevent the escape of the liquid from between the two layers. The translucent layer can be either translucent or transparent. The translucent layer can typically be a thin layer of poly(ethylene terephthalate). An image-bearing layer is exposed to ultraviolet radiation. After a period of time of exposure, preferably of not greater than about 20 minutes, a complete image which corresponds to the ultraviolet radiation passing through the image-bearing layer is formed in the polymeric layer. The image-bearing layer can be an ordinary silver negative, etc. The liquid media is preferably a solution of 50 parts by weight ethanol and 50 parts by weight glycerine. The halogen-containing vinylogous resin is capable of being readily dehydrohalogenated to a visibly different unsaturated polymer having at least 5 conjugate double bonds. The vinylogous resin can be poly (vinyl chloride acetate). The metallic component, zinc oxide, is quite desirable because it, usually, serves as a good background contrast to the colored image which is formed upon the exposure of the polymeric layer.

PATENTED OCT 26 1971
3,615,456
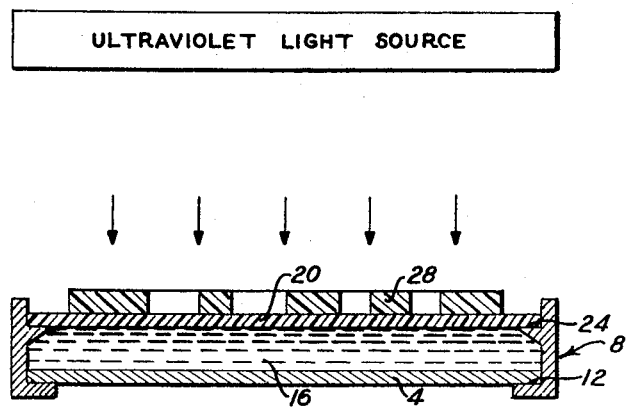
INVENTORS
JENNIE L. TOUCHETTE
ARTHUR D. KETLEY
BY
Virgil H. March
ATTORNEY

PROCESS FOR PHOTOIMAGING CERTAIN POLYMERIC SUBSTANCES CONTAINING PIGMENTS

BACKGROUND OF THE INVENTION

1. Objectives of the Invention

It is an objective of this invention to provide a new and improved process for preparing an imaged surface. It is another object to provide an imaged polymeric layer containing a metallic component, which has been prepared by exposing said layer through an imaged layer which is separated from said polymer layer by means of a liquid media layer. Still further objects will be apparent from the following description of this invention. 2. Prior Art The instability of vinyl chloride polymers as a result of prolonged exposure to light, that is, ultraviolet light, is well known and initially results in a slight yellow or brown discoloration. Normally, the mechanical properties of vinyl chloride polymers are not impaired until an advanced stage of dehydrochlorination is reached and the resins have become quite brown or black.

It is further known that poly(vinyl chloride acetate) is sensitive to ultraviolet light in the same manner as are vinyl chloride polymers.

BROAD DESCRIPTION OF THE INVENTION

This invention includes a process of photoimaging a polymeric layer which includes halogen-containing vinylogous resins and metallic components. A liquid media layer is placed on the polymeric layer, or between the polymeric layer and a translucent layer. The translucent layer can be either translucent or transparent. The liquid media layer includes one or more liquids which are translucent and chemically inert in relation to the polymeric layer. The liquid media layer can be ethanol, but is preferably a mixture of 50 parts by weight ethanol and 50 parts by weight glycerine. An image bearing layer is placed upon the surface of the translucent layer (or liquid media layer), and exposed to ultraviolet radiation, whereby an image is formed in and on the polymeric layer. The image corresponds to the areas where the ultraviolet radiation struck the surface of the polymeric layer. The imaged layer is then removed. The metallic component can be a pigment, such as, zinc oxide. The pigment helps form a suitable background for the image. The image bearing layer can be a stencil, or it can be a continuous tone, line or halftone positive or, in fact, any transparent positive or negative may be used. The halogen-containing vinylogous resin includes homopolymers of vinyl halides, copolymers of vinyl halides and unsaturated esters, homopolymers of vinylidene halides, copolymers of vinylidene halides and unsaturated esters, and halogenated polyethylenes.

DETAILED DESCRIPTION OF THE INVENTION

The polymeric systems (or polymers) useful within the scope of this invention are the halogen-containing vinylogous resins which may readily be dehydrohalogenated to a visibly different unsaturated polymer having at least 5 preferably 10 or more conjugate double bonds. Poly(vinyl chloride acetate) compositions which contain a majority of vinyl chloride monomer in relation to the vinyl acetate monomer are the preferred polymeric systems because those polymeric compositions seem to be able to be imaged rapidly, yet retain a great amount of resistance to normal heat and light exposure for a long period of time without losing sharpness of the image. Based upon 100 parts of vinyl chloride and vinyl acetate in the copolymer, the vinyl chloride monomer should normally range between about 40 parts by weight to 100 parts but, preferably, ranges between about 62 parts by weight and about 96 parts. The most preferred composition contains 9 parts by weight vinyl acetate and 91 parts by weight vinyl chloride in the copolymer. Copolymers of vinyl chloride and vinyl acetate can be prepared by any of the methods disclosed in Schildknecht, C. E., Vinyl and Related Polymers, John Wiley & Sons, Inc., N.Y. (1959) at pages 398-402, and the references cited in said book. The poly(vinyl chloride acetate) compositions may have a molecular weight greater than about 4,000 and, preferably, greater than about 8,000.

Other unsaturated esters (besides vinyl acetate) can be used in an interpolymer system with vinyl chloride. Such interpolymer systems are useful within the process of this invention since they undergo the process of dehydrohalogenation upon exposure to ultraviolet light. An important consideration of the use of these other interpolymer systems is that the melting or the softening point of the interpolymer system must not be too low to allow their use in exposure of 10 minutes or more to ultraviolet light to image them. If the interpolymer system becomes too soft, the image may be distorted in the interpolymer systems and their usefulness will be extremely limited. Examples of suitable vinyl chloride vinyl ester copolymers are polyvinyl chloride formate, polyvinyl chloride benzoate, polyvinyl chloride stearate, polyvinyl chloride oleate, polyvinyl chloride diethyl maleate, polyvinyl chloride diethyl fumarate, polyvinyl chloride methyl acrylate, polyvinyl chloride ethyl acrylate, polyvinyl chloride butyl acrylate, polyvinyl chloride octyl acrylate, and polyvinyl chloride methyl methacrylate. The maleate and fumarate copolymers with vinyl chloride are particularly useful because they have the same dehydrohalogenation properties which the poly(vinyl chloride acetate) compositions have, but have slightly elevated softening points. It should be noted that all of above-listed polymers are unsaturated esters which have been interpolymerized with vinyl chloride. Also useful are interpolymers of vinyl chloride with two or more unsaturated esters, such as vinyl acetate and vinyl formate.

Methods of obtaining the above-cited specified interpolymer systems can be found at page 729 of Vol. 14, of Kirk-Othmer, Encyclopedia of Chemical Technology, The Interscience Encyclopedia, Inc., N.Y. (1955), and the reference cited herein.

The polymeric system can be a homopolymer of vinyl chloride or even vinyl bromide, fluoride, or iodide. It is known that polyvinyl chloride is light-sensitive, but so are other polyvinyl halides. Polyvinyl bromide is extremely light-sensitive and is therefore not a preferred polymeric system. Poly(vinyl chloride acetate) is preferred over poly(vinyl chloride) because the former is more heat and light stable and retains its mechanical and chemical properties longer than the latter.

Copolymers of the vinyl halides, polymers of vinylidene chloride or bromide and polymers of halogenated polyethylene are usable polymeric systems, provided they meet the aforestated requirements.

The useful polymeric systems of this invention may contain other monomers, provided that such other monomers do not exceed about 30 parts by weight per 100 parts weight of the normal monomers. Examples of these other materials are maleic acid, vinyl methyl ether, acrylic and acrylonitrile, etc.

The support layer containing the polymeric systems can contain materials such as plasticizers, initiators, inhibitors, etc. The most common material which is used in the polymer compositions are plasticizers. Any of the conventional plasticizers can be used in the compositions. The preferred plasticizer is di-2-ethylhexyl sebacate, trioctyl phosphate, poly(propylene sebacate), poly(propylene adipate), dibutylphthalate, etc. The amount of plasticizer which can be incorporated into the polymeric systems is quite high and often ranges up to about 50 or more parts by weight based upon 100 parts by weight of the monomers in the polymeric system.

The other crucial element in the support layer containing the polymeric system is a halogen-free metal or metal oxide or metal salt. These metallic components are capable of combining with free halide radicals to produce Friedel-Crafts type of metal halide catalysts capable of catalyzing the dehydrohalogenation of polymeric system. The ultraviolet radiation exposure causes the formation of halogen in the form of free radicals, which forms a Friedel-Crafts type metal halide catalyst with the metallic oxide. The catalyst then causes dehydrohalogenation of the polymer and formation of multiple ethylenic double bonds, resulting in a visible darkening. Polymeric compositions which are generally stable under normal sunlight are obviously preferred as they afford the means of image formation without the darkening of the nonimaged areas within a short period of exposure to normal sunlight. The suitable metallic components can be incorporated into those polymeric compositions to provide normally stable systems which react under the desired conditions. The metallic components are often added, as is known in the art, to stabilize (photostabilization) the polymeric systems, e.g., polyvinyl chloride. The use of a liquid media layer quite surprisingly overcomes the stabilizing effect of the metallic components to cause them to act in a manner which results in a darkened polymer system (imaged). Zinc oxide is the preferred metallic component along these lines, and also serves a valuable function as a pigment with great hiding power in the nonimaged areas. Zinc oxide is known as "China White" or "Chinese White."

Any suitable metallic component can also serve as a pigment, therefore metallic components which serve both functions are desirable. Pigments of that type are incorporated into the poly(vinyl chloride acetate) compositions so that when the layer is imaged the discoloration usually in the brownish or blackish image areas stands out against a pigmented background. White is the preferred pigment as it is the visually preferred background and also because the brownish and blackish color in the image areas is least decreased in its visual effect by having a white pigment incorporated in those areas. As used within the scope of this invention, the term "pigment" is defined as any finely divided insoluble material (metallic component) that imparts a color to the polymeric composition to which it is added, or makes said polymeric composition black, white or grey. White-colored metallic pigments having a suitable degree of opacity are preferred. The most preferred pigment is zinc oxide, otherwise known as "China White" or "Chinese White." Other suitable white color pigments are zinc sulfate, titanium dioxide, white lead (basic carbonate, basic sulfate, and basic silicate), leading zinc oxides, magnesium silicate, magnesium carbonate, magnesium oxide, barium sulfate and so forth. Other compatible metallic pigments are listed in Kirk-Othmer *Encyclopedia of Chemical Technology*, Vol. 10, The Interscience Encylopedia, Inc., N.Y. (1953), at pages 612 to 695.

The metallic component should have a particle diameter between about 5 and about 500 millimicrons and preferably between about 20 and about 100 millimicrons.

While the desired metallic components can be incorporated into the polymeric composition in any manner desired, a particularly desirable method is to compound the metallic components into a paste utilizing a plasticizer, such as di-2-ethylhexyl phthalate, and mixing that into the monomer composition prior to polymerization. A typical and preferred paste would contain 7 parts of the metallic components, such as zinc oxide, and 1 part of di-2-ethylhexyl phthalate, said paste comprising 5 parts by weight of 100 parts by weight of the polymeric composition (and any plasticizer not contained in the paste). The amount of the metallic component can range up to about 25 percent and, preferably, up to about 10 percent of the total composition based upon the plasticizer and the polymer.

The layer containing the polymeric system and the metallic component can be between about 0.1 mils and about 100 mils in thickness, although, preferably, said layer is between of about 1 mils and about 10 mils in thickness.

The liquid media is crucial to the process of this invention and is preferably absolute ethanol. In general, any liquid media can be used which is compatible with the translucent top layer and with the support layer. Another critical factor which must be considered when selecting a proper liquid media is that it must be translucent and must not seriously impede the passage of the ultraviolet light during the imaging exposure. Examples of useful alcohols are ethanol, isopropanol, *tert*-butanol, ethylene glycol, etc. Other suitable media are polarorganic liquids such as ketones, nitriles, nitroalkanes, etc.

Any of the useful liquid media, can be thickened with certain inert compatible materials, such as glycerine. An example of this is the use of ethanol. While the use of ethanol as the liquid media gave a good imaging results, far better imaging results were obtained by the use of glycerine as a thickening agent in the ethanol, in, say, a 50—50 mixture, because the thickened ethanol prevented the support layer from coming in physical contact with the interpolymer layer which was to be imaged. In general, the thickened liquid media are preferred because they do not "pool" or gather in such a manner that the translucent layer and poly(vinyl chloride acetate) layer do not come in actual physical contact. Such physical contact results in either no image or an extremely poor image in the contact areas. Glycerine is the preferred thickening agent and a 50—50 (parts by weight) mixture of ethanol and glycerine is the most preferred thickened liquid media. Triglycerides, $CH_2(R_1CO_2)\cdot CH(R_2CO_2)\cdot CH_2(R_3CO_2)$, such as stearin, tribenzoin, triacetin, are useful thickeners as they are soluble in and compatible with the liquid media, such as ethanol. Monoglycerides, such as acetin, are also useful thickeners.

The translucent layer which is utilized in this invention can be any translucent film through which ultraviolet light (radiation) will pass so as to image the underlying polymeric sheet and which is not reactive with and is compatible with the liquid medium layer. Examples of suitable translucent layers which can be used in this film are the high polymers, e.g., polystyrene, polyamides, polyolefins, polyesters, vinyl polymers and cellulosics are quite suitable and in order for the above adhesive relationships to obtain these films may or may not contain an auxiliary layer to control anchorage. Specifically, the support can be composed of various film-forming plastics, such as addition polymers, vinyl acetate, styrene, isobutylene and acrylonitrile; the linear condensation polymers, such as the polyesters, e.g., polyethylene terephthalate; the polyamides, e.g., polyhexamethylene sebacamide; polyester amides, e.g., polyhexamethyleneadipamide/adipate, and the like. Fillers or other reinforcing agents can be present in the synthetic resin or polymer support such as various fibers (synthetic, modified, or natural), e.g., cellulosic fibers, for instance, cotton, cellulose acetate, viscose rayon, paper; glass wool; nylon and the like. These layers may be also used in laminated form; provided the overall layer is translucent. The top cover may also be prepared from such transparent materials as transparent glass or semitransparent paper, etc. In general, the thickness of the top translucent layer is not critical.

The "exposure unit" as it is termed herein comprises a translucent layer, the support layer and a liquid media situated between said layers. To prevent the liquid media from coming out of the edges of the exposure unit, the exposure unit can be placed in a prefixed mold which covers the end portions, or the edges can be taped, etc. A mold which holds the materials apart, of course, is preferred because it helps to insure that the liquid media will uniformly remain between the two layers and will not allow them to come in physical contact. The image bearing layer can be placed directly upon the surface of said translucent layer or when the phrase "placing an image bearing layer on the surface of said translucent layer" is utilized, it is broad enough within the meaning of this invention to include the use of an air gap ranging up to 100 mils between said image-bearing layer and the surface of said translucent layer. The term "exposure unit" is also broad enough to include an arrangement wherein the translucent layer is not used, that is, wherein the image bearing layer is placed directly on the liquid media layer (or just above said layer, leaving an air gap). When the translucent layer is not used and an air gap is not present, the image bearing layer is subjected to the disadvantages associated with coming in contact with a liquid layer.

The image bearing layer can be any line, continuous tone or halftone transparency which is either a conventional silver negative or can be one of the photocurable composition negatives, the preparation of which is disclosed in U.S. application No. 766,948 (Disclosure no. 2636), inventors: Ketley, Touchette and Kehr, filed: Oct. 11, 1968. A positive may also be used which fits any of the above categories. Also, a stencil may be used as a negative or positive. The form which the image-bearing layer takes is not crucial.

The imaging is done by exposing the support layer to ultraviolet light through a negative, etc. Any source of ultraviolet light is useful. The most useful ultraviolet light as defined within this invention is that radiation which has a wavelength between 2,000 and 4,000 Angstroms units. The exposure time should, preferably be less than about 40 minutes and, even more preferably, be less than about 20 minutes. Times as great as about 2 hours, or more, may be used, but such a duration of exposure is not necessary or desirable in most instances. Of course, where a particularly translucent liquid media or translucent layer or a considerable amount of pigment is used in the support layer, a longer time of exposure may be necessary.

The Figure shows a preferred embodiment of this invention wherein the numeral 4 represents the support layer. Layer 4 is placed in mold 8 so that its edges lay upon the top surface of lip 12 or mold 8. Liquid media 16 is then placed in mold 8 on top of layer 4. Translucent layer 20 is placed in the top interior part of mold 8 so that its edges lay on the top surface of rim 24 of mold 8. Image-bearing layer 28 which is, for example, a conventional-line silver negative is laid upon translucent layer 20. Ultraviolet (U.V.) light as indicated in FIG. 1 is then used to expose layer 4 to the image contained in layer 28. After a suitable time of exposure, the U.V. light source is turned off. Layer 28, layer 20, and liquid media 16 are removed. Layer 4 contains an image. Layer 4 is dried and can be used as a reproduction of the image of the negative.

The following examples will aid in explaining but should not be deemed as limiting the instant invention. In all cases unless otherwise noted all parts and percentages are by weight.

Example 1

A poly(vinyl chloride acetate) sheet, which was 10-mils-thick and which contained zinc oxide ("China White") pigment, was placed in a mold which was identical to that shown in the Figure. The poly(vinyl chloride acetate) layer contained, based upon 100 parts by weight monomers, 95 parts by weight vinyl chloride monomer and 5 parts by weight vinyl acetate polymer. The molecular weight of the polymer was 180,000. Based upon the 100 parts of the basic polymer components, 50 parts by weight plasticizer was included, said plasticizer being di-2-ethylhexyl phthalate. The pigment (average particle size = 25 millimicrons) was incorporated into the composition before the polymeric film was formed by means of a paste composition which contained 7 parts by weight zinc oxide to 1 part by weight di-2-ethylhexyl phthalate. (The total weight of the paste incorporated was 5 parts by weight based upon 100 parts of the polymeric composition). Next, the liquid media was placed in the mold. The liquid media was ethanol and the thickness of the liquid media layer was about 30 mils. Then a 5-mil, transparent layer of poly(ethylene terephthalate) was placed in the mold near the top. The poly(ethylene terephthalate) film is commercially available under the trade designation "Mylar" from E. I. duPont De Nemours & Co., Inc. Then a negative was placed on top of the "Mylar" layer.

The negative was prepared as disclosed in the following paragraph:

To a 2-liter flask equipped with stirrer, thermometer and gas inlet and outlet was charged 450 gm. (0.45 moles) of poly(tetramethylene ether glycol), having a hydroxyl number of 112 and a molecular weight of approximately 1,000, along with 900 gm. (0.45 moles) of poly(tetramethylene ether glycol), having a hydroxyl number of 56 and a molecular weight of about 2,000 both commercially available from Quaker Oats Co. The flask was heated to 110° C. under vacuum and nitrogen and maintained thereat for 1 hour. The flask was then cooled to approximately 70° C. whereat 0.1 gm. of dibutyl tin dilaurate was added to the flask. A mixture of 78 gm. (0.45 moles) of tolylene diisocyanate and 78 gm. (0.92 moles) of allyl isocyanate was thereafter added to the flask dropwise with continuous stirring. The reaction was maintained at 70° C. for 1 hour after addition of all the reactants. The thus formed allyl-terminated polymer will hereinafter be referred to as Polymer A. 10 gm. of Polymer A, 0.9 gm. of pentaerythritol tetrakis ($\beta$-mercaptopropionate) and 1.5 gm. carbon black (Sterling FT) in ethylene glycol monethyl ether were mixed together and then heated in a vacuum oven for 5 minutes at 120° C. 0.15 gm. of benzophenone was then added and mixed for 2 minutes. A 1-mil film of this material was spread on a sheet of opaque "Mylar" and a 1.0-mil-thick sheet of clear "Mylar" rolled on top to produce a sandwich. The sandwich (clear side up) was exposed under a continuous tone photographic negative to a Westinghouse Sunlamp (275 watt, RS) 9 inches away for 3 minutes. Upon peeling the sandwich apart, a negative image, i.e., one identical to the photographic negative through which the light passed, adhered to the opaqued "Mylar" and a positive continuous tone image, i.e., reversed relative to the negative through which the light passes was formed on the clear "Mylar". The images were cleaned by immersing in an ultrasonic bath containing ethanol at 60° C. for 10 seconds. The resulting positive image was dried and further cured by reexposure to the U.V. source for 5 minutes to give a silverless, black and white, continuous tone, negative transparency.

The negative was exposed from the top to the U.V. radiation from a Westinghouse lamp (275 watts RS) for 20 minutes. An image was obtained on and in the poly(vinyl chloride acetate).

EXAMPLE 2

Example 1 was repeated, except that a conventional, line, silver, negative transparency was used. An image was obtained.

EXAMPLE 3

Example 1 was repeated, except that a conventional, line, silver, positive transparency was used. An image was obtained.

EXAMPLE 4

Example 1 was repeated, except that a "Marks 'A' Lot" negative was used. A "Marks 'A' Lot" is a felt pen which is commercially available from Carter's Ink Co. An image was obtained.

EXAMPLE 5

Example 1 was repeated, except that no liquid media was used, no transparent layer was used and no negative was used during the exposure. No image was obtained.

EXAMPLE 6

Example 1 was repeated, except that no transparent layer and no negative were used. No image was obtained.

EXAMPLE 7

Example 1 was repeated, except that the exposure time was 72.8 minutes and the liquid media was a solution of 50 parts by weight ethanol and 50 parts by weight glycerin. An excellent image was obtained which did not contain any areas in which there was no image or poor image.

EXAMPLE 8

In examples 1 through 4, wherein ethanol was used and images were formed, those images had small areas where no image or a poor image was formed due to the "pooling" of the ethanol. The "pooling" effect was such that the layer of ethanol was not uniform throughout and left unreacted areas.

EXAMPLE 9

Example 1 was repeated, except that no transparent "Mylar" layer was used. The negative was placed directly on the liquid media layer. An image was obtained.

EXAMPLE 10

Example 9 was repeated, except that a 50 mil air gap was left between the surface of the negative and the surface of the liquid media layer. An image was obtained.

EXAMPLE 11

Example 1 was repeated, except that 100 mil air gap was left between the surface of the negative and the surface of the translucent layer. An image was obtained.

EXAMPLE 12

Example 1 was repeated, except that titanium dioxide (average particle size = 20 millimicrons) was used as the pigment. An image was obtained.

EXAMPLE 13

Example 1 was repeated, except that zinc sulfide (average particle size = 53 millimicrons) was used as the pigment. An image was obtained.

EXAMPLE 14

Example 1 was repeated, except that magnesium silicate (average particle size = 17 millimicrons) was used as the pigment. An image was obtained.

EXAMPLE 15

Example 1 was repeated, except that lithopone (average particle size = 58 millimicrons) was used as the pigment. An image was obtained.

EXAMPLE 16

Example 1 was repeated, except that lead chromate (average particle size = 23 millimicrons) was used as the pigment. An image was obtained.

EXAMPLE 17

Example 1 was repeated, except that the molecular weight of the vinyl chloride acetate polymer was 11,000. An image was obtained.

EXAMPLE 18

Example 1 was repeated, except that the molecular weight of the vinyl chloride acetate polymer was 15,800. An image was obtained.

EXAMPLE 19

Example 1 was repeated, except that the polymer contained 91 parts of weight vinyl chloride and 9 parts by weight vinyl acetate, based upon 100 parts by weight of the monomers. The solvent used in preparing the polymeric system was methyl ethyl ketone. An image was obtained.

EXAMPLE 20

Example 1 was repeated, except that the polymer contained 62 parts by weight vinyl chloride and 38 parts by weight vinyl acetate, based upon 100 parts by weight of the monomers. The solvent used in preparing the polymeric system was n-butyl acetate. An image was obtained.

EXAMPLE 21

Example 1 was repeated, except that the polymer contained 95 parts by weight of vinyl chloride and 5 parts by weight vinyl acetate, based upon 100 parts by weight of the monomers. The solvent used in preparing the polymeric system was cyclohexane. An image was obtained.

EXAMPLE 22

Example 1 was repeated, except that the polymer contained 87 parts by weight of vinyl chloride and 3 parts by weight vinyl acetate, based upon 100 parts by weight the monomers. The solvent used in preparing the polymeric system was a mixture of methyl ethyl ketone and toluene (1/1 parts by weight). An image was obtained.

EXAMPLE 23

Example 1 was repeated, except that the polymer contained 86 parts by weight vinyl chloride, 3 parts by weight vinyl acetate and 1 part by weight maleic acid, based on 100 parts by weight of the monomers. The solvent used in preparing the polymeric system was a mixture of methyl ethyl ketone and toluene (1/1 parts by weight). An image was obtained.

EXAMPLE 24

Example 1 was repeated, except that the polymer contained 95 parts by weight vinyl chloride and 5 parts by weight of methyl acrylate. An image was obtained.

EXAMPLE 25

Example 1 was repeated, except that the polymer contained 90 parts by weight vinyl chloride and 10 parts by weight of ethyl acrylate. An image was obtained.

EXAMPLE 26

Example 1 was repeated, except that the polymer contained 95 parts by weight of vinyl chloride and 5 parts by weight of octyl acrylate. An image was obtained.

EXAMPLE 27

Example 1 was repeated, except that the polymer contained 95 parts by weight of vinyl chloride and 5 parts by weight of methyl methacrylate. An image was obtained.

EXAMPLE 28

Example 1 was repeated, except that the polymer contained 80 parts by weight vinyl chloride, 10 parts by weight vinylidene and 10 parts by weight 2-ethylhexyl acrylate. An image was obtained.

EXAMPLE 29

Example 1 was repeated, except that the polymer contained 85 parts by weight vinyl chloride and 15 parts by weight vinylidene chloride. An image was obtained.

EXAMPLE 30

Example 1 was repeated, except that lead silicate (average particle size = 36 millimicrons) was used as the pigment. An image was obtained.

EXAMPLE 31

Example 1 was repeated, except that the polymer contained 80 parts by weight vinyl chloride and 20 parts by weight of dimethylmaleate. An image was obtained.

EXAMPLE 32

Example 1 was repeated, except that the polymer contained 80 parts by weight of vinyl chloride and 20 parts by weight of diethyl maleate. An image was obtained.

EXAMPLE 33

Example 1 was repeated, except that the polymer contained 90 parts by weight of vinyl chloride and 10 parts by weight of diethyl fumarate. An image was obtained.

EXAMPLE 34

Example 1 was repeated, except that the polymer contained 80 parts by weight dimethyl maleate and 20 parts by weight diethyl maleate. An image was obtained

EXAMPLE 35

Example 1 was repeated, except that the polymer contained 58 parts by weight vinylidene chloride and 42 parts by weight methyl methacrylate. An image was obtained.

EXAMPLE 36

Example 1 was repeated, except that the polymer contained 85 parts by weight vinylidene chloride and 15 parts by weight ethyl acrylate. An image was obtained.

EXAMPLE 37

Example 1 was repeated, except that the polymer contained 62 parts by weight vinylidene chloride and 38 parts by weight methyl acrylate. An image was obtained.

EXAMPLE 38

Example 1 was repeated, except that the polymer contained 80 parts by weight vinylidene chlorofluoride and 20 parts by weight vinyl acetate. An image was obtained.

EXAMPLE 39

Example 1 was repeated, except that the polymeric substance was a homopolymer of vinyl bromide. An image was obtained.

EXAMPLE 40

Example 1 was repeated, except that the polymeric substance was a homopolymer of vinyl fluoride. An image was obtained.

EXAMPLE 41

Example 1 was repeated, except that the polymeric substance was a homopolymer of vinylidene fluoride. An image was obtained.

EXAMPLE 42

Example 1 was repeated, except that the polymeric substance was a homopolymer of vinylidene chlorofluoride. An image was obtained.

EXAMPLE 43

Example 1 was repeated, except that the polymeric substance was a homopolymer of chlorinated polyethylene. An image was obtained.

It is claimed:

1. A process for photoimaging a polymeric layer, that is comprised of a halogen-free metallic pigment selected from the group consisting of metals, metal oxides and metal salts and (b) a polymer which is a halogen-containing vinylogous resin which can be dehydrohalogenated to a visibly different unsaturated polymer having at least 5 conjugated double bonds, which comprises:

(a) assembling an exposure unit which comprises said polymeric layer and a liquid media layer selected from the group consisting of alcohols, ketones, nitriles, and nitroalkanes;

(b) placing an image bearing layer on the surface of said liquid media layer, where said image bearing layer will allow the passage of ultraviolet radiation through the nonimaged areas thereof;

(c) exposing said image bearing layer to ultraviolet radiation to dehydrohalogenate said polymer to form an image on and in said polymeric layer which corresponds to the areas of the image bearing layer through which the ultraviolet radiation passed; and (d) removing the imaged polymeric layer.

2. A process as described in claim 1 wherein said exposure unit comprises a translucent layer which is placed upon the uncovered liquid media layer and which comprises placing said image bearing layer on said translucent layer before said exposure.

3. A process as described in claim 2 wherein said polymer is selected from the group consisting of the homopolymers of vinyl halides, the copolymers of vinyl halides and unsaturated esters, the homopolymers of vinylidene halides, the copolymers of vinylidene halides and unsaturated esters, and the halogenated polyethylenes.

4. A process as described in claim 2 wherein said polymeric layer is comprised of a polymer of vinyl chloride and an unsaturated vinyl monomer.

5. A process as described in claim 2 wherein the polymeric layer is comprised of a polymer of vinyl chloride and vinyl acetate.

6. A process as described in claim 2 wherein the liquid media layer is comprised of ethanol.

7. A process as described in claim 2 wherein the liquid media layer is comprised of a mixture of 50 percent by weight ethanol and 50 percent by weight glycerine.

8. A process as described in claim 2 wherein said translucent layer is comprised of poly(ethylene terephthalate).

9. A process as described in claim 8 wherein said poly(ethylene terephthalate) layer is between about 0.5 mils thick and about 100 mils thick.

10. A process as described in claim 2 wherein the thickness of the polymeric layer is between about 0.5 mils and about 100 mils.

11. A process as described in claim 2 wherein the image-bearing layer is comprised of a stencil, a line negative transparency, a halftone negative transparency, a continuous tone negative transparency, a halftone positive transparency, a continuous tone positive transparency, or a line positive transparency.

12. A process as described in claim 1 wherein there is an air gap between the surface of the liquid media layer and the surface of the image-bearing layer of up to about 100 mils.

13. A process as described in claim 2 wherein there is an air gap between the surface of the translucent layer and the image-bearing layer of up to about 100 mils.

14. A process as described in claim 2 wherein the exposure time to ultraviolet radiation is not greater than about 2 hours.

15. A process as described in claim 2 wherein said metallic pigment is present in an amount up to about 25 parts by weight based on 100 parts by weight of said polymer.

16. A process as described in claim 2 wherein the polymeric layer contains a copolymer of vinyl chloride and vinyl acetate and contains up to about 10 parts by weight zinc oxide based on 100 parts by weight of said copolymer.

17. The process of claim 1 in which the metallic pigment is a member selected from the group consisting of zinc oxide, zinc sulfide titanium dioxide, white lead, leaded zinc oxides, lithapone, magnesium silicate, magnesium carbonate, magnesium oxide, and barium sulfate.

* * * * *